(12) United States Patent
Zhang et al.

(10) Patent No.: US 8,704,764 B2
(45) Date of Patent: Apr. 22, 2014

(54) CORRECTING CLIENT DEVICE INPUTS TO A VIRTUAL MACHINE

(75) Inventors: Zhiyuan Zhang, Woburn, MA (US); Michael J. Matczynski, Waltham, MA (US); Seshubabu Pasam, Westford, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 203 days.

(21) Appl. No.: 13/284,247

(22) Filed: Oct. 28, 2011

(65) Prior Publication Data

US 2013/0106698 A1   May 2, 2013

(51) Int. Cl.
*G06F 3/033* (2013.01)
(52) U.S. Cl.
USPC ............................. 345/156; 345/157; 345/163

(58) Field of Classification Search
None
See application file for complete search history.

(56) References Cited

U.S. PATENT DOCUMENTS

| 8,001,483 | B2 * | 8/2011 | de Souza et al. | 715/779 |
| 2009/0058804 | A1 * | 3/2009 | Nagao | 345/157 |

* cited by examiner

*Primary Examiner* — Joseph Haley

(57) ABSTRACT

A device receives, from a virtual machine, graphical information and information relating to a remote mouse cursor, and displays the graphical information and the remote mouse cursor. The device constrains boundaries associated with a local mouse cursor generated by the device, and prevents the local mouse cursor from being displayed by the device, and. The device further receives input information associated with the remote mouse cursor, corrects a magnitude associated with the input information, and provides the corrected input information to the virtual machine.

21 Claims, 11 Drawing Sheets

CORRECTING CLIENT DEVICE INPUTS TO A VIRTUAL MACHINE

BACKGROUND

Cloud computing is the delivery of computing as a service rather than as a product, whereby shared resources, software, and information are provided to client devices (e.g., computers, smart phones, etc.) as a utility over a secure or an unsecure network, such as the Internet. Cloud computing environments provide computation, software, data access, and/or storage services that do not require end-user knowledge of a physical location and configuration of a system that delivers the services.

A data center is a facility used to house computer systems and associated components, such as telecommunications and storage systems. A data center generally includes redundant or backup power supplies, redundant data communications connections, environmental controls (e.g., air conditioning, fire suppression, etc.), and security devices. In one example, a data center may exchange information with a virtual machine executing in a cloud computing environment. The information may be utilized by client devices. When a client device cannot directly access the virtual machine (e.g., due to a failed connection with the cloud computing environment), the client device may still access the information via a data center connection to the virtual machine. However, in such an arrangement, inputs received from the client device may be undesirably enhanced by both the client device and the virtual machine.

DETAILED DESCRIPTION OF PREFERRED EMBODIMENTS

The following detailed description refers to the accompanying drawings. The same reference numbers in different drawings may identify the same or similar elements.

Systems and/or methods described herein may enable a client device to access a virtual machine via a data center connection to the virtual machine. The systems and/or methods may prevent inputs received from the client device, such as mouse cursor movements, from being undesirably magnified by the virtual machine.

In one example implementation, the client device may receive graphical information and a remote mouse cursor from a virtual machine via a data center device, and may display the graphical information and the remote mouse cursor. The client device may constrain boundaries associated with a local mouse cursor of the client device, and may hide (i.e., prevent display of) the local mouse cursor. The client device may receive input information (e.g., movement) associated with the remote mouse cursor, may correct a magnitude of the input information, and may provide the corrected input information to the virtual machine via the data center device. The client device may receive, from the virtual machine and via the data center device, updated graphical information and an updated position of the remote mouse cursor based on the corrected input information, and may display the updated graphical information and the updated position of the remote mouse cursor.

As used herein, the term "user" is intended to be broadly interpreted to include a client device, or a user of a client device.

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

Figure 1:
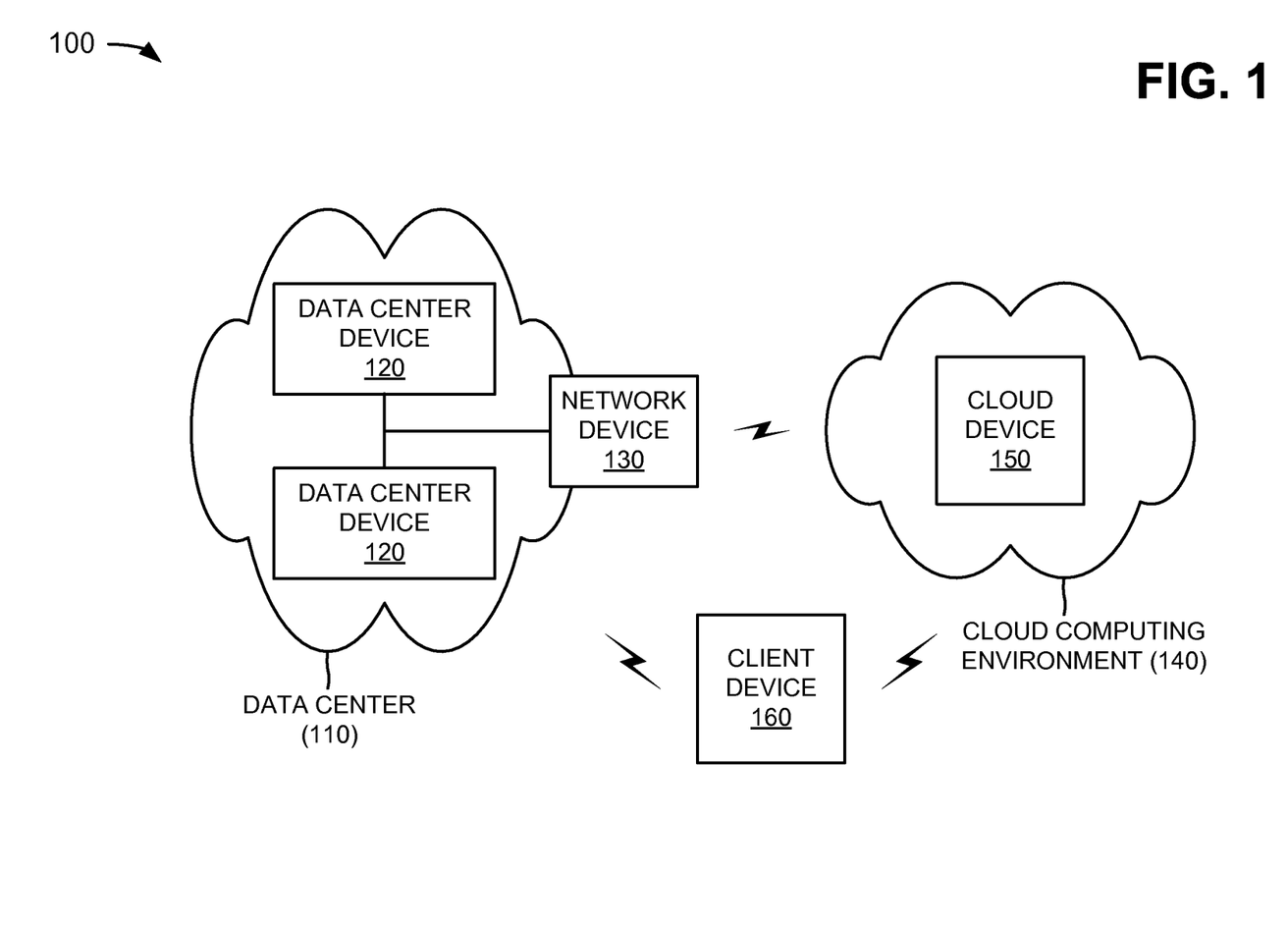
FIG. 1 is a diagram of an example network in which systems and/or methods described herein may be implemented.

FIG. 1 is a diagram of an example network 100 in which systems and/or methods described herein may be implemented. As illustrated, network 100 may include a data center 110 that includes data center devices 120 and a network device 130; a cloud computing environment 140 that includes a cloud device 150; and a client device 160. Devices and/or networks of network 100 may interconnect via wired and/or wireless connections. One data center 110, two data center devices 120, one network device 130, one cloud computing environment 140, one cloud device 150, and one client device 160 have been illustrated in FIG. 1 for simplicity. In practice, there may be more data centers 110, data center devices 120, network devices 130, cloud computing environments 140, cloud devices 150, and/or client devices 160.

Data center 110 may include a facility or a network with computer systems, server devices, and associated components, such as telecommunications and storage systems. Data center 110 may include redundant or backup power supplies, redundant data communications connections, environmental controls, security devices, etc. In one example, data center 110 may share information, with cloud computing environment 140, which may be utilized by client device 160. Data center 110 may include resources, such as a device (e.g., a network device, a server, a computer system, etc.), data (e.g., availability information, license information, etc.), a service (e.g., a load balancing service, network information collection, etc.), etc.

Data center device 120 may include one or more server devices, or other types of computation and/or communication devices, that gather, process, search, and/or provide information in a manner described herein. In one example implementation, data center device 120 may enable client device 160 to communicate with cloud device 150 when client device 160 is unable to directly communicate with cloud device 150.

Network device 130 may include a gateway, a router, a switch, a firewall, a network interface card (NIC), a hub, a bridge, a proxy server, a multiplexer, or some other type of device that processes and/or transfers traffic. In one example implementation, network device 130 may include a firewall that creates an encrypted tunnel with cloud device 150 so that a secure data path may be provided between data center devices 120 and cloud device 150.

Cloud computing environment 140 may include an environment that delivers computing as a service rather than as a product, whereby shared resources, software, and information may be provided to client device 160 as a utility over a network. Cloud computing environment 140 may provide computation, software, data access, and/or storage services that do not require end-user (e.g., client device 160) knowledge of a physical location and configuration of a system that delivers the services. In one implementation, cloud computing environment 140 may include a data center similar to data center 110.

Cloud device 150 may include one or more server devices, or other types of computation and/or communication devices, that gather, process, search, and/or provide information in a manner described herein. In one example implementation, cloud device 150 may communicate with client device 160 via data center device 120 when client device 160 is unable to directly communicate with cloud device 150.

Client device 160 may include a radiotelephone; a personal communications system (PCS) terminal that may combine, for example, a cellular radiotelephone with data processing and data communications capabilities; a smart phone; a personal digital assistant (PDA) that can include a radiotelephone, a pager, Internet/intranet access, etc.; a laptop computer; a tablet computer; a desktop computer; a workstation computer; or other types of computation and/or communication devices. In one example, client device 160 may include a device that is capable of communicating with cloud device 150 via data center device 120.

Although FIG. 1 shows example devices/networks of network 100, in other implementations, network 100 may include fewer devices/networks, different devices/networks, differently arranged devices/networks, or additional devices/networks than depicted in FIG. 1. Alternatively, or additionally, one or more devices/networks of network 100 may perform one or more other tasks described as being performed by one or more other devices/networks of network 100.

Figure 2:
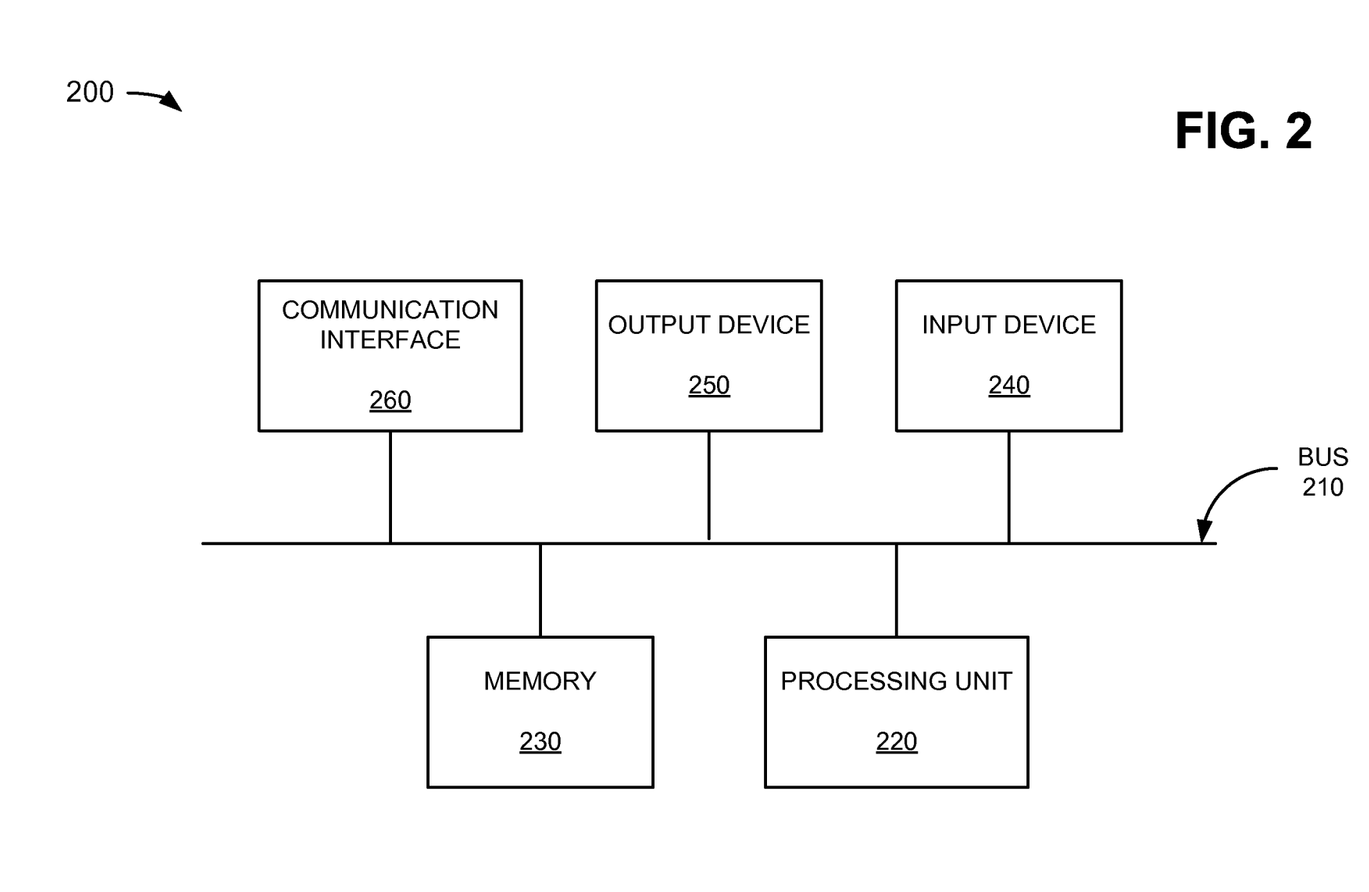
FIG. 2 is a diagram of example components of a device that may correspond to one of the devices of the network depicted in FIG. 1.

FIG. 2 is a diagram of example components of a device 200 that may correspond to one or more devices of network 100 (FIG. 1). In one example implementation, one or more of the devices of network 100 may include one or more devices 200 or one or more components of device 200. As illustrated in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more ASICs, FPGAs, or the like.

Memory 230 may include a RAM or another type of dynamic storage device that stores information and instructions for execution by processing unit 220, a ROM or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, a touch screen display, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 260 may include mechanisms for communicating with other devices, such as other devices of network 100.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, or additionally, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
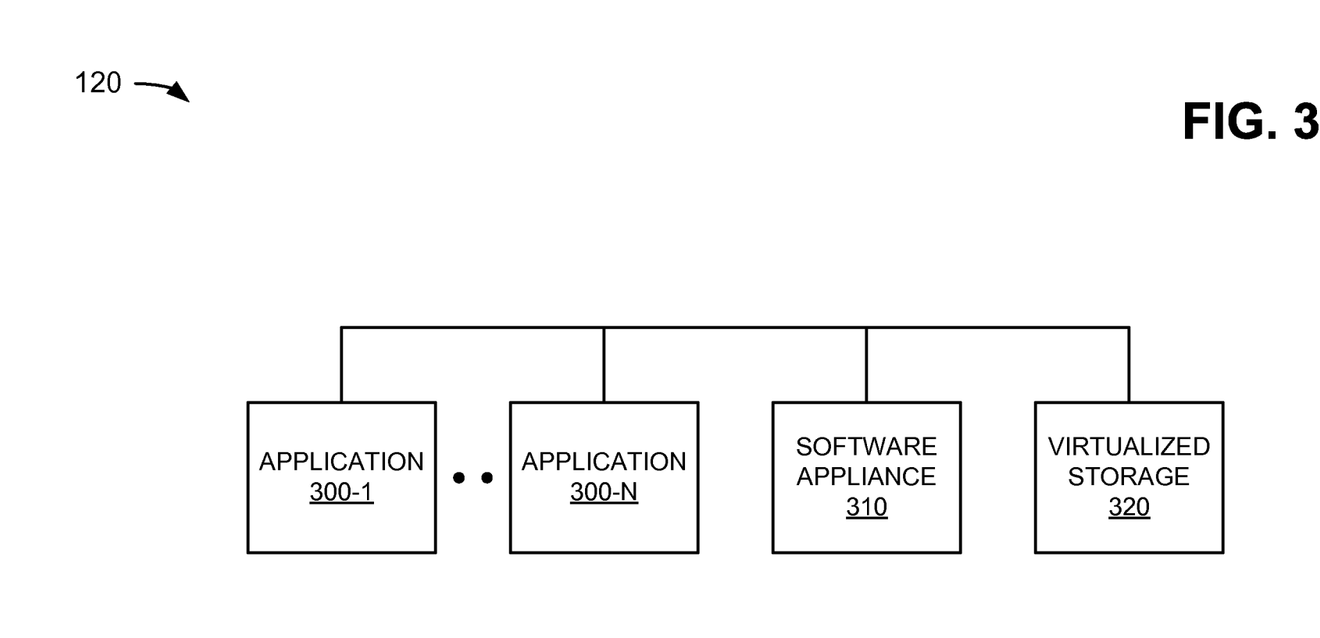
FIG. 3 is a diagram of example functional components of a data center device of FIG. 1.

FIG. 3 is a diagram of example functional components of data center device 120. In one implementation, the functions described in connection with FIG. 3 may be performed by one or more components of device 200 (FIG. 2) or by one or more devices 200. As shown in FIG. 3, data center device 120 may include multiple applications 300-1 through 300-N (collectively referred to herein as "applications 300," and, in some instances, singularly as "application 300"), a software appliance 310, and virtualized storage 320.

Applications 300 may include one or more software applications, available at data center device 120, that are dependent upon the function of data center device 120. For example, applications 300 may include software that handles core business and operational data of an organization, enterprise software, telecommunications software, etc. Applications 300 may be designed for execution by multiple host devices, where each host device may execute a single component. In one example, components of applications 300 may include databases, file servers, application servers, middleware, etc.

Software appliance 310 may securely bridge data center device 120 with cloud computing services provided by cloud computing environment 140. Software appliance 310 may extend data center 110 security and control into cloud computing environment 140 so that applications 300 may remain integrated with data center 110 tools and policies and may be managed as if applications 300 were executing locally. Software appliance 310 may move applications 300 between data center 110 and cloud computing environment 140 based on requirements of an organization. In one example, software appliance 310 may include management components for discovering applications 300, orchestrating cloud deployments, and managing cloud utilization. Software application 310 may create a secure data path to bridge network connectivity between data center 110 and a chosen cloud computing provider. In one example implementation, data center device 120 may utilize multiple software appliances 120 for availability and scaling purposes.

Virtualized storage 320 may include storage systems or devices that may use virtualization techniques to enable better functionality and more advanced features within the storage systems or devices of data center device 120. In one example, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system greater flexibility in how they manage storage for end users. File virtualization may eliminate dependencies between data accessed at a file level and a location where files are physically stored. This may enable optimization of storage use, server consolidation, and performance of non-disruptive file migrations.

Although FIG. 3 shows example functional components of data center device 120, in other implementations, data center device 120 may include fewer functional components, different functional components, differently arranged functional components, or additional functional components than depicted in FIG. 3. Additionally, or alternatively, one or more functional components of data center device 120 may perform one or more other tasks described as being performed by one or more other functional components of data center device 120.

Figure 4:
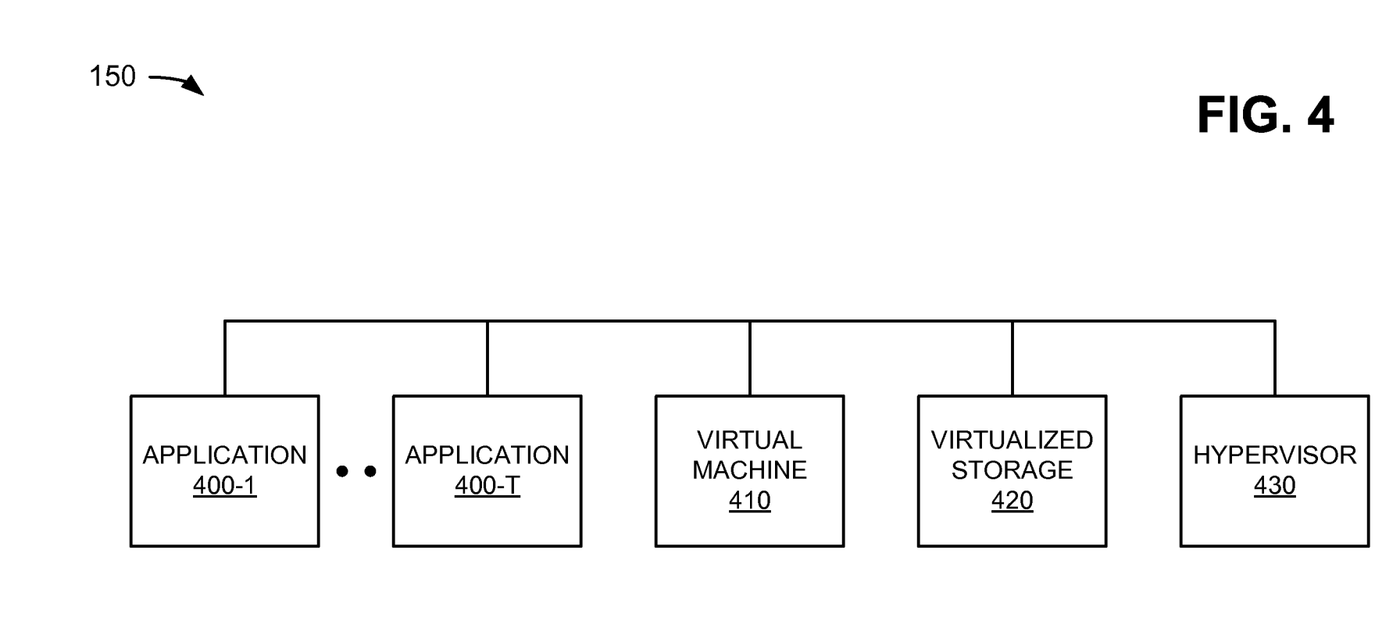
FIG. 4 is a diagram of example functional components of a cloud device of FIG. 1.

FIG. 4 is a diagram of example functional components of cloud device 150. In one implementation, the functions described in connection with FIG. 4 may be performed by one or more components of device 200 (FIG. 2) or by one or more devices 200. As shown in FIG. 4, cloud device 150 may include multiple applications 400-1 through 400-T (collectively referred to herein as "applications 400," and, in some instances, singularly as "application 400"), a virtual machine 410, virtualized storage 420, and a hypervisor 430.

Applications 400 may include one or more software applications that may be provided to or accessed by client device 160, which may eliminate a need to install and execute the software applications on client device 160. For example, applications 400 may include word processing software, database software, content, monitoring software, financial software, communication software, and/or any other software capable of being provided via a cloud computing environment.

Virtual machine (VM) 410 may include a software implementation of a machine (e.g., a computer) that executes programs like a physical machine. Virtual machine 410 may be either a system virtual machine or a process virtual machine, depending upon use and degree of correspondence to any real machine by virtual machine 410. A system virtual machine may provide a complete system platform that supports execution of a complete operating system (OS). A process virtual machine may execute a single program, and may support a single process. In one example implementation, virtual machine 410 may execute on behalf of a data center 110 user (e.g., client device 160), and may manage infrastructure of cloud computing environment 140, such as data management, synchronization, and long-duration data transfers. Virtual machine 410 may provide encryption services for network and storage utilization to ensure that cloud computing environment providers do not have access to data center 110 network or storage communications.

Virtualized storage 420 may include storage systems or devices that may use virtualization techniques to enable better functionality and more advanced features within the storage systems or devices of cloud device 150. In one example, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system greater flexibility in how they manage storage for end users. File virtualization may eliminate dependencies between data accessed at a file level and a location where files are physically stored. This may enable optimization of storage use, server consolidation, and performance of non-disruptive file migrations.

Hypervisor 430 may provide hardware virtualization techniques that allow multiple operating systems (e.g., "guest operating systems") to execute concurrently on a host computer. Hypervisor 430 may present to the guest operating systems a virtual operating platform, and may manage the execution of the guest operating systems. Multiple instances of a variety of operating systems may share the virtualized hardware resources. Hypervisor 430 may provide an interface to infrastructure as a service (IaaS) provided by cloud computing environment 140.

Although FIG. 4 shows example functional components of cloud device 150, in other implementations, cloud device 150 may include fewer functional components, different functional components, differently arranged functional components, or additional functional components than depicted in FIG. 4. Additionally, or alternatively, one or more functional components of cloud device 150 may perform one or more other tasks described as being performed by one or more other functional components of cloud device 150.

Figure 5A:
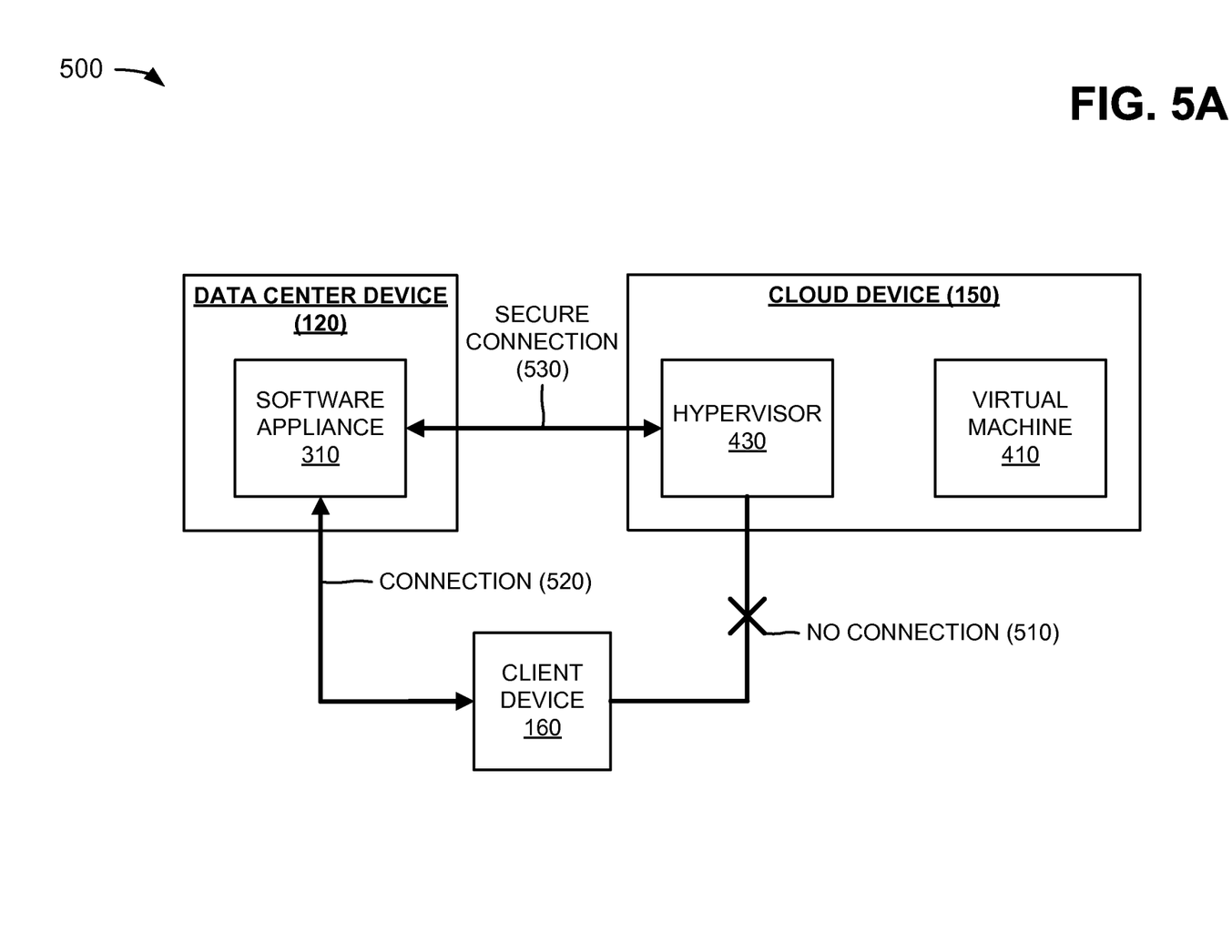
FIGS. 5A and 5B are diagrams of example operations capable of being performed by an example portion of the network in FIG. 1.
Figure 5B:
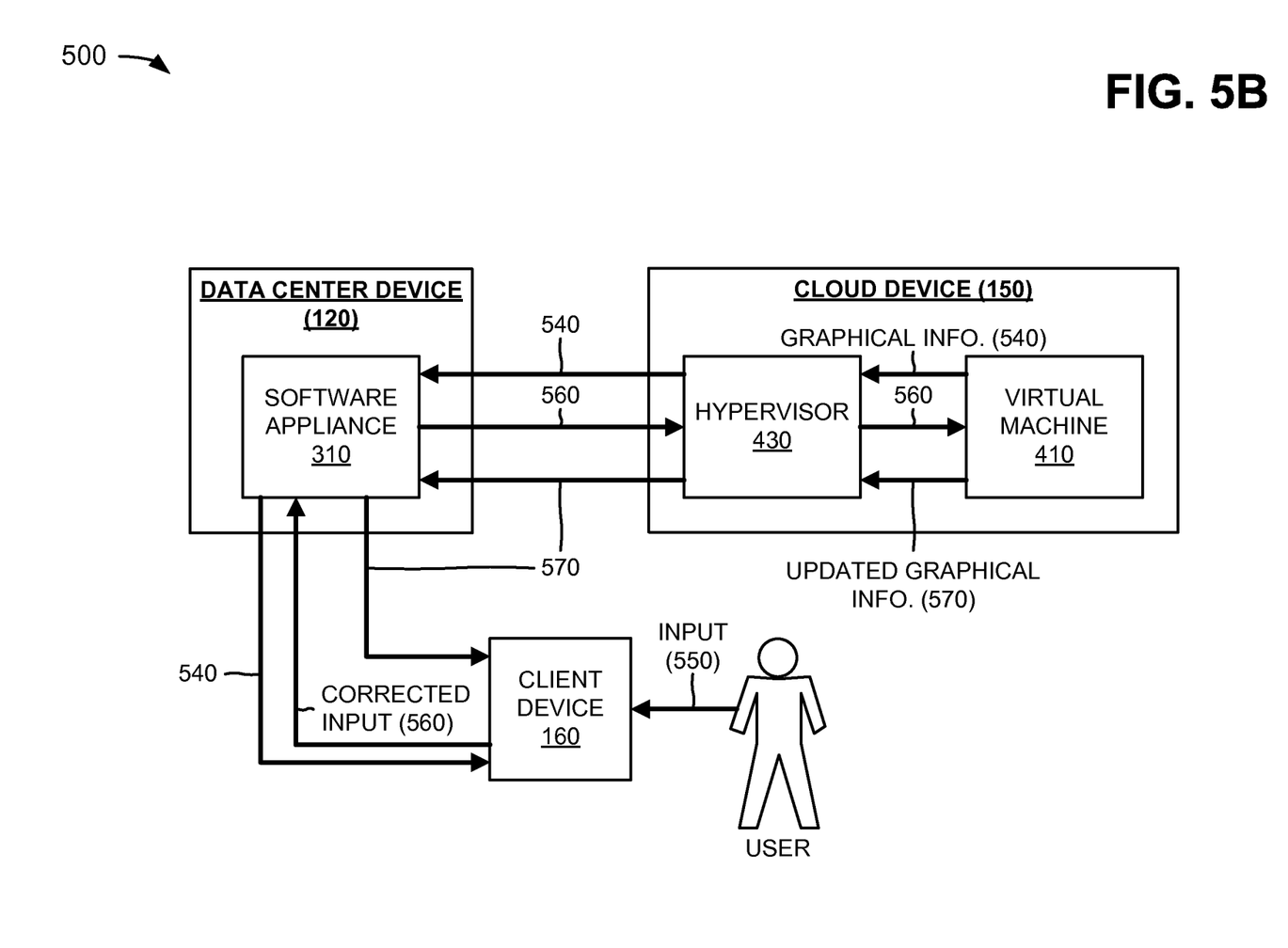

FIGS. 5A and 5B are diagrams of example operations capable of being performed by an example portion 500 of network 100 (FIG. 1). As shown, network portion 500 may include data center device 120 with software appliance 310; cloud device 150 with virtual machine 410 and hypervisor 430; and client device 160. Data center device 120, cloud device 150, client device 160, software appliance 310, virtual machine 410, and hypervisor 430 may include the features described above in connection with, for example, one or more of FIGS. 1-4.

With reference to FIG. 5A, virtual machine 410 may execute on top of hypervisor 430 of cloud device 150, and client device 160 may typically communicate with virtual machine 410 via a connection with hypervisor 430. However, on some occasions, client device 160 may lose the connection with hypervisor 430, as indicated by reference number 510, and may be unable to communicate with virtual machine 410 via hypervisor 430. In such situations, client device 160 may establish a connection 520 with software appliance 310 of data center device 120, and software appliance 310 may establish a secure connection 530 with hypervisor 430. Hypervisor 430 may execute a graphics server that provides information generated by virtual machine 410. The graphics server of hypervisor 430 may communicate with client device 160, via connections 520 and 530, so that client device 160 may display the information provided by virtual machine 410.

For example, as shown in FIG. 5B, virtual machine 410 may provide graphical information 540 to hypervisor 430, and hypervisor 430 may forward graphical information 540 to software appliance 310. Software appliance 310 may provide graphical information 540 to client device 160, and client device 160 may display graphical information 540. Graphical information 540 may include a remote mouse cursor and software applications provided by virtual machine 410 (e.g., via a graphical user interface), such as a desktop, a word processing application, a communication application, etc. However, when a user provides inputs (e.g., mouse cursor movements) to client device 160, in response to the displayed graphical information 540 provided by virtual machine 410, the inputs may receive correction assistance from client device 160. For example, client device 160 may execute an operating system that provides mouse acceleration. With mouse acceleration, any physical mouse movement by the user may be enhanced once.

Furthermore, client device 160 may provide the enhanced physical mouse movement to virtual machine 410 via software appliance 310 and hypervisor 430. Virtual machine 410 may automatically provide input correction assistance to the enhanced physical mouse movement since a configuration of virtual machine 410 may be unmodified. The input correction assistance may compound the original physical mouse movement twofold because the original mouse movement may be enhanced by both client device 160 and by virtual machine 410. Virtual machine 410 may provide the compounded physical mouse movement to client device 160 via hypervisor 430 and software appliance 310, and client device 160 may display the compounded physical mouse movement. The end result may be that a user's original input may appear disjointed from the representation of the original input displayed by client device 160. For example, a local mouse cursor provided by client device 160 may be displayed in a first location by client device 160, while a remote mouse cursor provided by virtual machine 410 (e.g., via graphical information 540) may be displayed in a second location, different than the first location, by client device 160. However, the local mouse cursor and the remote mouse cursor should be displayed in the same location by client device 160.

In order to address this, client device 160 may hide the local mouse cursor when the user indicates that he or she wants to interact with graphical information 540 provided by virtual machine 410. Client device 160 may continue to display the remote mouse cursor to provide an illusion to the user of one unified mouse cursor. Client device 160 may also constrain the boundaries of the hidden local mouse cursor so that the hidden local mouse cursor may not move further than a display area provided by graphical information 540. For example, the constraining of the boundaries of the hidden local mouse cursor may be similar to way a mouse cursor may be prevented from exiting a display area provided by a desktop computer on a display screen. In another example, the local mouse cursor may be constrained to an actual window size of an application. The window size may be resized to a size that is greater than or less than an actual display area provided by virtual machine 410 (e.g., via graphical information 540). If the user wishes to remove the constraints on the local mouse cursor, the user may select, via client device 160, a particular combination of keystrokes (e.g., defined by client device 160) and the constraints on the local mouse cursor may be removed.

As further shown in FIG. 5B, client device 160 may receive, from the user, an input 550, such as a mouse movement associated with the remote mouse cursor, a keystroke, etc. When client device 160 receives input 550, client device 160 may correct input 550 to create a corrected input 560. Corrected input 560 may include input 550 after correction to prevent compounding of input 550 by virtual machine 410. In one example, client device 160 may poll inputs to client device 160 at a frequency that is less than a frequency at which the operating system of client device 160 polls for inputs, such as physical mouse movements. By lowering a frequency at which client device 160 samples for the remote mouse location, client device 160 may reduce the compounded mouse acceleration produced by virtual machine 410.

Client device 160 may provide corrected input 560 to software appliance 310, and software appliance 310 may forward corrected input 560 to virtual machine 410 via hypervisor 430. Virtual machine 410 may receive corrected input 560, and may adjust graphical information 540 based on corrected input 560 to create updated graphical information 570. For example, virtual machine 410 may adjust a location of the remote mouse cursor based on corrected input 560, and may provide the adjusted location of the remote mouse cursor via updated graphical information 570. Virtual machine 410 may provide updated graphical information 570 to software appliance 310, via hypervisor 430, and software appliance 310 may provide updated graphical information 570 to client device 160. Client device 160 may receive updated graphical information 570, and may display updated graphical information 570 to the user.

In one example implementation, input 550 may include keystrokes provided by the user to client device 160. Because the operating system of client device 160 may intercept the keystrokes, client device 160 may permit the user to input impermissible keystrokes. For example, the keystrokes Ctrl-Alt-Delete may cause client device 160 to reboot but may have no affect on virtual machine 410. In such situations, client device 160 may provide an alternate set of keystrokes to client device 160. The alternate set of keystrokes may enable a user to instruct virtual machine 410 to perform a set of keystrokes that the user would have provided through client device 160 but cannot because the operating system of client device 160 intercepts and consumes the keystrokes, which effectively hides the keystrokes.

Although FIG. 5 shows example components of network portion 500, in other implementations, network portion 500 may include fewer components, different components, differently arranged components, or additional components than depicted in FIG. 5. Additionally, or alternatively, one or more components of network portion 500 may perform one or more other tasks described as being performed by one or more other components of network portion 500.

Figure 6A:
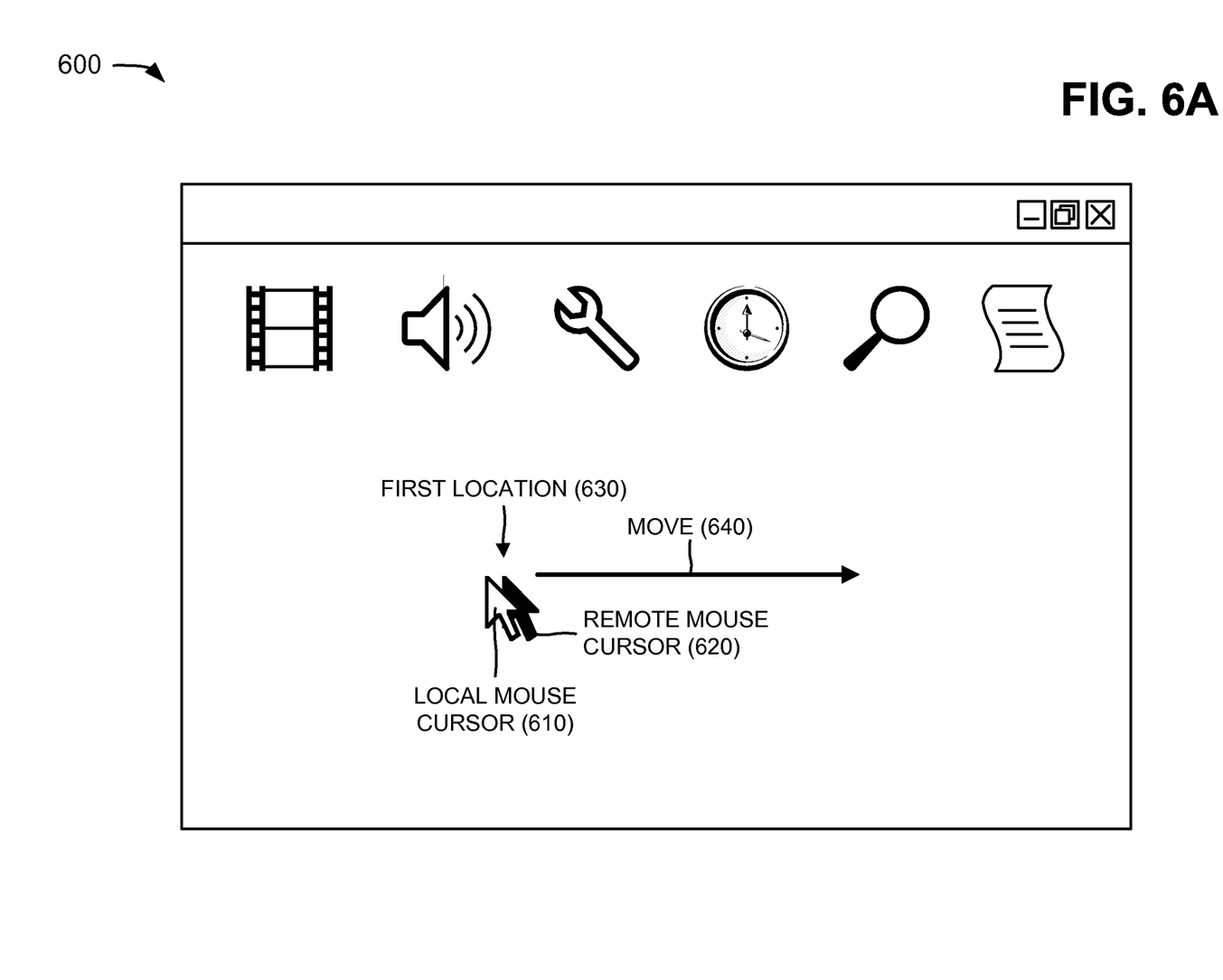
FIGS. 6A-6C are diagrams of example user interfaces capable of being provided by a client device of FIG. 1.
Figure 6B:
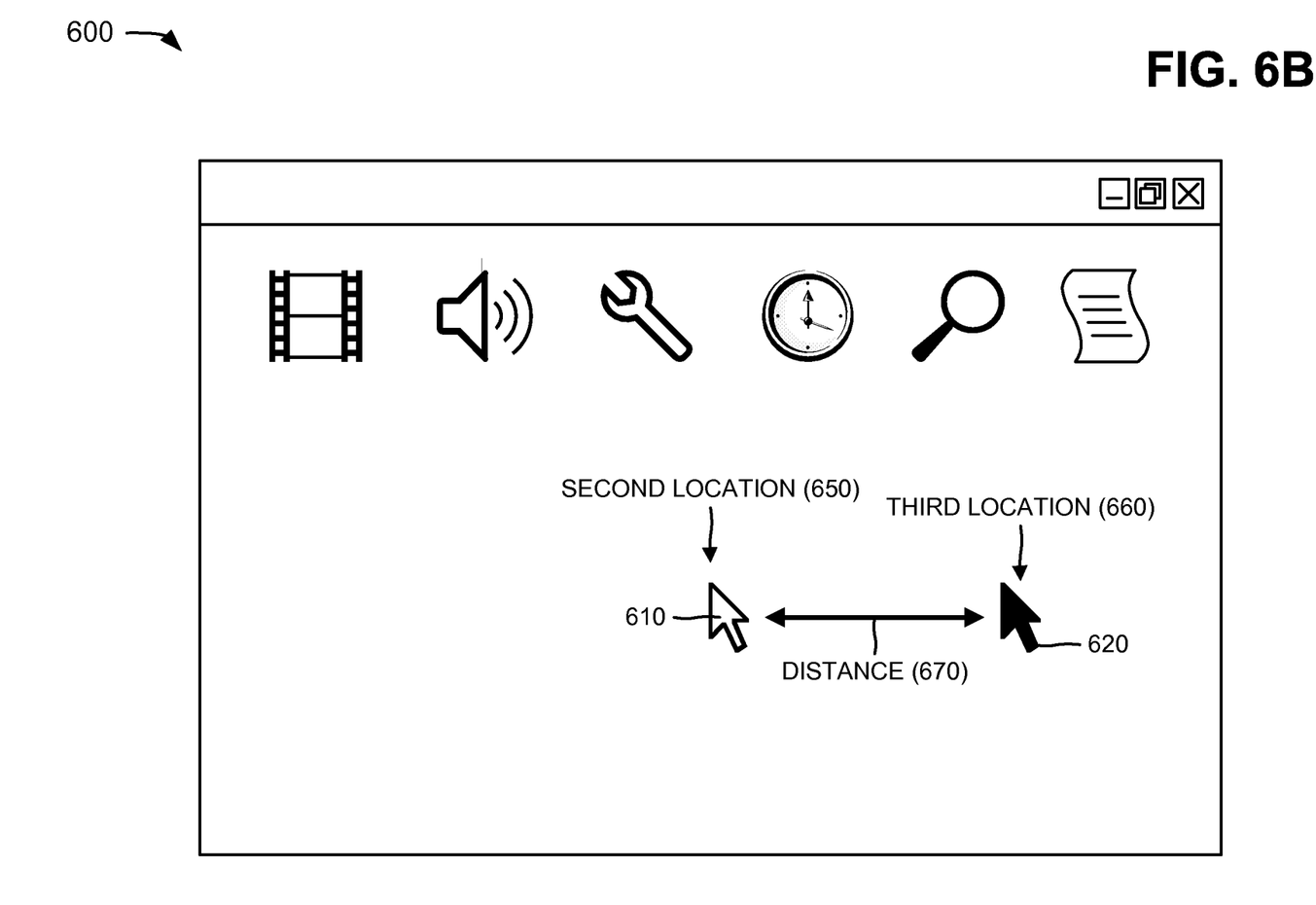
Figure 6C:
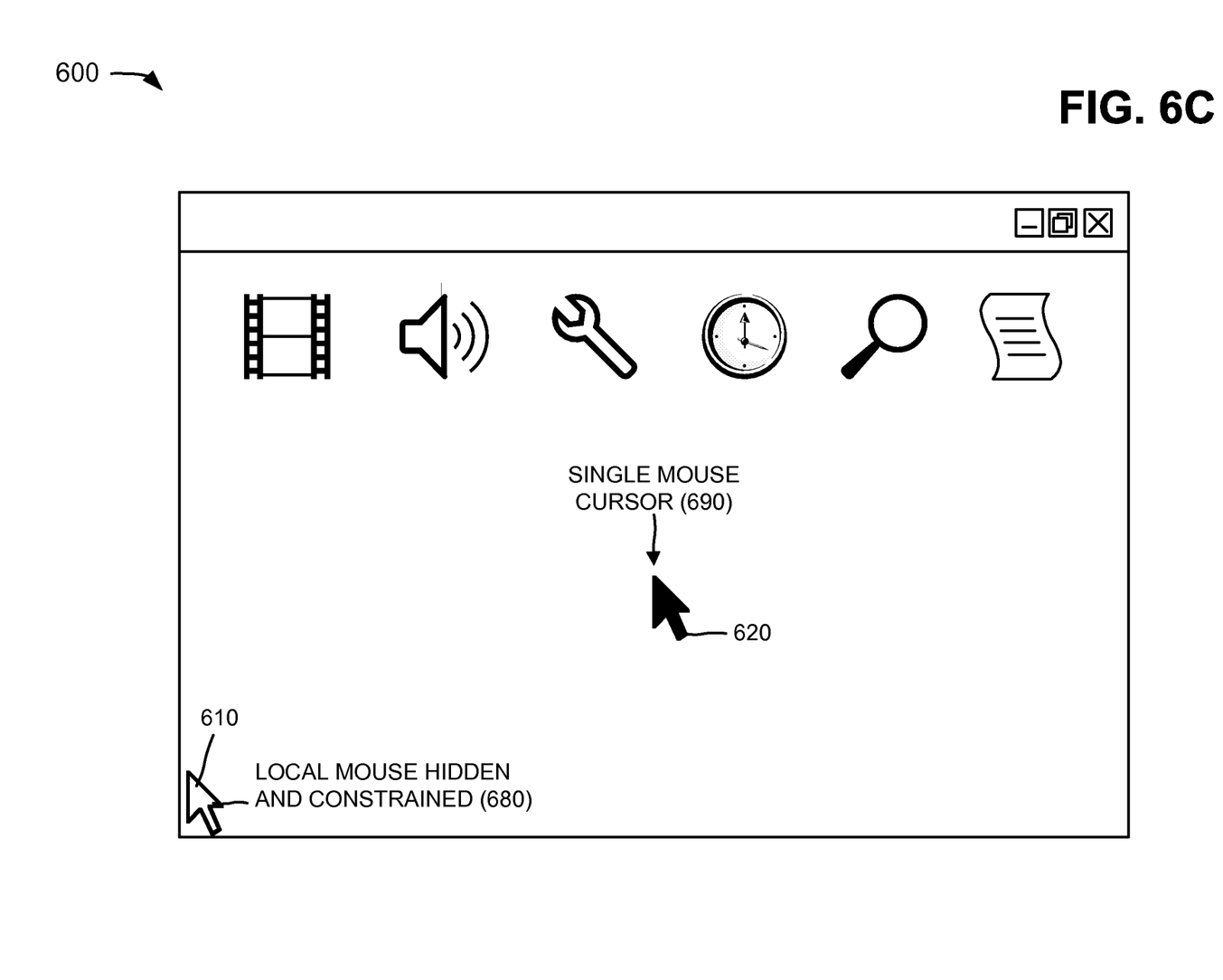

FIGS. 6A-6C are diagrams of example user interfaces 600 capable of being provided by client device 160. User interfaces 600 may include graphical user interfaces (GUIs) or non-graphical user interfaces, such as text-based interfaces. User interfaces 600 may provide information to users via customized interfaces (e.g., proprietary interfaces) and/or other types of interfaces (e.g., browser-based interfaces, etc.). User interfaces 600 may receive user inputs via one or more input devices (e.g., input device 240, FIG. 2), may be user-configurable (e.g., a user may change the size of user interfaces 600, information displayed in user interfaces 600, color schemes used by user interfaces 600, positions of text, images, icons, windows, etc., in user interfaces 600, etc.), and/or may not be user-configurable. Information associated with user interfaces 600 may be selected and/or manipulated by a user of client device 160 (e.g., via a touch screen display, a mouse, and/or a keyboard).

As shown in FIG. 6A, user interface 600 may display a local mouse cursor 610, generated by client device 160, at a first location 630. User interface 600 may also display a remote mouse cursor 620, generated by virtual machine 410, at first location 630 as well. As further shown in FIG. 6A, a user of client device 160 may cause local mouse cursor 610 to move in a particular direction, as indicated by reference number 640.

If client device 160 does not provide correction for the movement of local mouse cursor 610, the input correction assistance may compound the movement of local mouse cursor 610 twofold because the mouse movement may be enhanced by both client device 160 and by virtual machine 410. The end result may be that the user's original input may appear disjointed from the representation of the original input displayed by client device 160. For example, as shown in FIG. 6B, user interface 600 may display local mouse cursor 610 at a second location 650 based on the movement. User interface 600 may, based on the movement, display remote mouse cursor 620 at a third location 660 that is spaced a distance 670 from second location 650. However, local mouse cursor 610 and remote mouse cursor 620 should be displayed in the same location by client device 160.

As shown in FIG. 6C, if client device 160 does provide correction for the movement of local mouse cursor 610, client device 160 may hide local mouse cursor 610 and may constrain the boundaries of local mouse cursor 610 so that local mouse cursor 610 may not move further than a display area of user interface 600, as indicated by reference number 680. Client device 160 may continue to display remote mouse cursor 620 to provide an illusion to the user of a single mouse cursor, as indicated by reference number 690.

Although user interfaces 600 of FIGS. 6A-6C depict a variety of information, in other implementations, user interfaces 600 may depict less information, different information, differently arranged information, or additional information than depicted in FIGS. 6A-6C.

Figure 7:
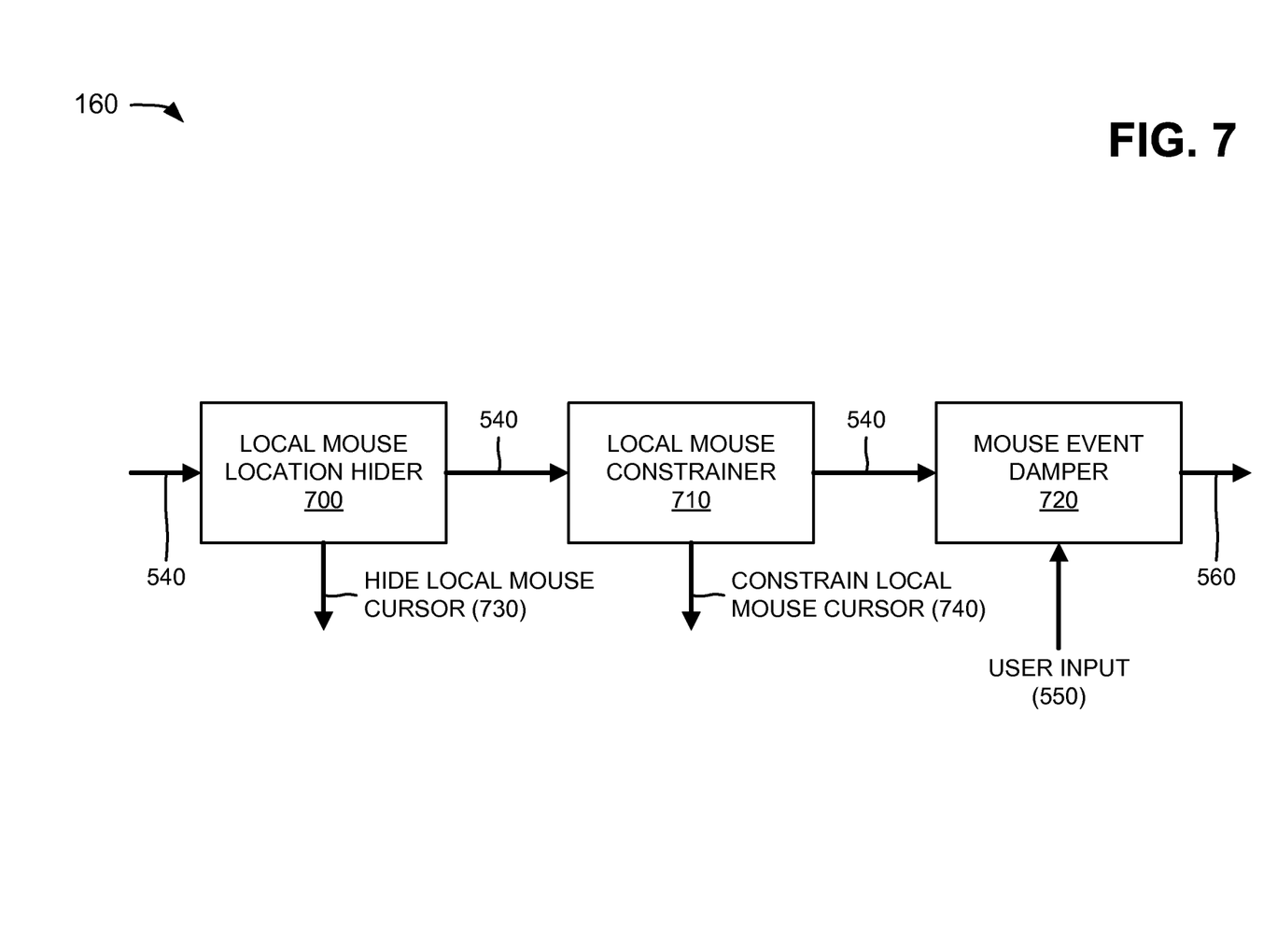
FIG. 7 is a diagram of example functional components of the client device.

FIG. 7 is a diagram of example functional components of client device 160. In one implementation, the functions described in connection with FIG. 7 may be performed by one or more components of device 200 (FIG. 2) or by one or more devices 200. As shown in FIG. 7, client device 160 may include a local mouse location hider 700, a local mouse constrainer 710, and mouse event damper 720.

Local mouse location hider 700 may receive graphical information 540, and may hide local mouse cursor 610 when the user indicates that he or she wants to interact with graphical information 540, as indicated by reference number 730. As further shown in FIG. 7, local mouse location hider 700 may provide graphical information 540 to local mouse constrainer 710.

Local mouse constrainer 710 may receive graphical information 540 from local mouse location hider 700, and may constrain the boundaries of local mouse cursor 610, as indicated by reference number 740. Constraining the boundaries of local mouse cursor 610 may prevent local mouse cursor 610 from moving further than a display area provided by graphical information 540. In one example, local mouse cursor 610 may be constrained to an actual window size of an application. The window size may be resized to a size that is greater than or less than an actual display area provided by virtual machine 410 (e.g., via graphical information 540). As further shown in FIG. 7, local mouse constrainer 710 may provide graphical information 540 to mouse event damper 720.

Mouse event damper 720 may receive graphical information 540 from local mouse constrainer 710, and may receive user input 550 from the user. Mouse event damper 720 may correct input 550 to create corrected input 560. In one example, mouse event damper 720 may poll inputs to client device 160 at a frequency that is less than a frequency at which the operating system of client device 160 polls for inputs, such as physical mouse movements. By lowering a frequency of sampling of the mouse location, mouse event damper 720 may reduce the compounded mouse acceleration produced by virtual machine 410. As further shown in FIG. 7, mouse event damper 720 may output corrected input 560.

Although FIG. 7 shows example functional components of client device 160, in other implementations, client device 160 may include fewer functional components, different functional components, differently arranged functional components, or additional functional components than depicted in FIG. 7. Additionally, or alternatively, one or more functional components of client device 160 may perform one or more other tasks described as being performed by one or more other functional components of client device 160.

Figure 8:
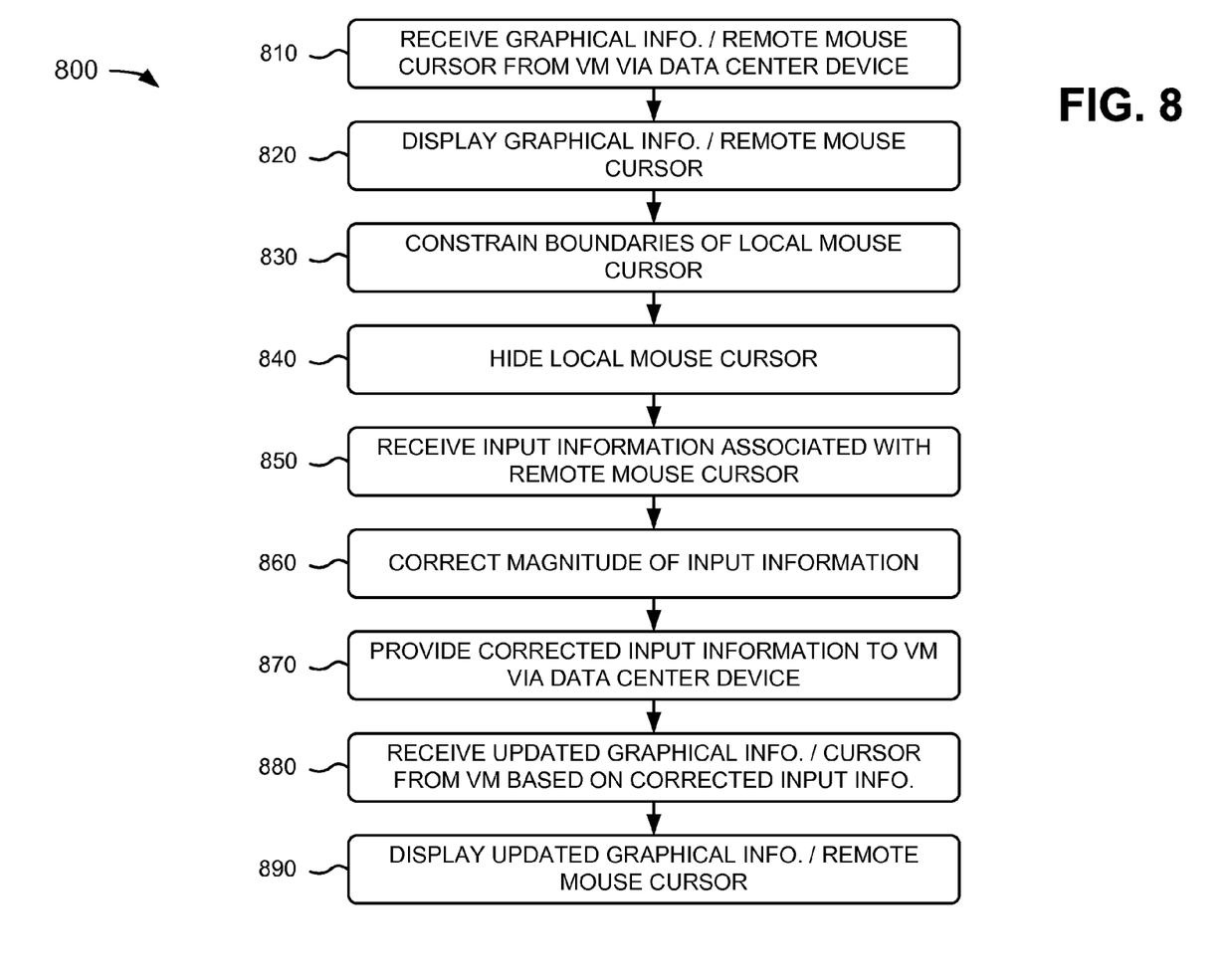
FIG. 8 is a flow chart of an example process for correcting client device inputs to a virtual machine according to an implementation described herein.

FIG. 8 is a flow chart of an example process 800 for correcting client device inputs to a virtual machine according to an implementation described herein. In one implementation, process 800 may be performed by client device 160. Alternatively, or additionally, some or all of process 800 may be performed by another device or group of devices, including or excluding client device 160.

As shown in FIG. 8, process 800 may include receiving graphical information and a remote mouse cursor from a virtual machine via a data center device (block 810), and displaying the graphical information and the remote mouse cursor (block 820). For example, in an implementation described above in connection with FIG. 5B, virtual machine 410 may provide graphical information 540 to hypervisor 430, and hypervisor 430 may forward graphical information 540 to software appliance 310. Software appliance 310 may provide graphical information 540 to client device 160, and client device 160 may display graphical information 540. Graphical information 540 may include a remote mouse cursor and software applications provided by virtual machine 410 (e.g., via a graphical user interface), such as a desktop, a word processing application, a communication application, etc.

As further shown in FIG. 8, process 800 may include constraining boundaries of a local mouse cursor (block 830), and hiding a local mouse cursor (block 840). For example, in an implementation described above in connection with FIG. 5B, client device 160 may hide (i.e., prevent display of) the local mouse cursor when the user indicates that he or she wants to interact with graphical information 540 provided by virtual machine 410. Client device 160 may continue to display the remote mouse cursor to provide an illusion to the user of one unified mouse cursor. Client device 160 may also constrain the boundaries of the hidden local mouse cursor so that the hidden local mouse cursor may not move further than a display area provided by graphical information 540.

Returning to FIG. 8, process 800 may include receiving input information associated with the remote mouse cursor (block 850), correcting a magnitude of the input information (block 860), and providing the corrected input information to the virtual machine via the data center device (block 870). For example, in an implementation described above in connection with FIG. 5B, client device 160 may receive, from the user, input 550, such as a remote mouse cursor movement, a keystroke, etc. When client device 160 receives input 550, client device 160 may correct input 550 to create corrected input 560. Corrected input 560 may include input 550 after correction to prevent compounding of input 550 by virtual machine 410. In one example, client device 160 may poll inputs to client device 160 at a frequency that is less than a frequency at which the operating system of client device 160 polls for inputs, such as physical mouse movements. By lowering a frequency at which client device 160 samples for the mouse location, client device 160 may reduce the compounded mouse acceleration produced by virtual machine 410. Client device 160 may provide corrected input 560 to software appliance 310, and software appliance 310 may forward corrected input 560 to virtual machine 410 via hypervisor 430.

As further shown in FIG. 8, process 800 may include receiving update graphical information and an update remote mouse cursor from the virtual machine based on the corrected input information (block 880), and displaying the updated graphical information and the updated remote mouse cursor (block 890). For example, in an implementation described above in connection with FIG. 5B, virtual machine 410 may receive corrected input 560, and may adjust graphical information 540 based on corrected input 560 to create updated graphical information 570. In one example, virtual machine 410 may adjust a location of the remote mouse cursor based on corrected input 560, and may provide the adjusted location of the remote mouse cursor via updated graphical information 570. Virtual machine 410 may provide updated graphical information 570 to software appliance 310, via hypervisor 430, and software appliance 310 may provide updated graphical information 570 to client device 160. Client device 160 may receive updated graphical information 570, and may display updated graphical information 570 to the user.

Systems and/or methods described herein may enable a client device to access a virtual machine via a data center's connection to the virtual machine. The systems and/or methods may prevent inputs received from the client device, such as mouse cursor movements, from being undesirably magnified by the virtual machine.

The foregoing description of implementations provides illustration and description, but is not intended to be exhaustive or to limit the implementations to the precise form disclosed. Modifications and variations are possible in light of the above teachings or may be acquired from practice of the implementations.

For example, while a series of blocks has been described with regard to FIG. 8, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving, by a device, graphical information and information relating to a position of a remote mouse cursor from a virtual machine;
   displaying, by the device, the graphical information and the remote mouse cursor;
   constraining, by the device, boundaries associated with a local mouse cursor generated by the device;
   preventing the local mouse cursor from being displayed by the device;
   receiving, by the device, input information associated with the remote mouse cursor;
   correcting, by the device, a magnitude associated with the input information, wherein correcting the magnitude associated with the input information comprises:
      receiving the input information at a frequency that is different than a frequency at which an operating system of the device receives inputs; and
   providing, by the device, the input information, with the corrected magnitude, to the virtual machine.

2. The method of claim 1, further comprising:
   receiving, based on the input information with the corrected magnitude, updated graphical information and an updated position of the remote mouse cursor;
   displaying the updated graphical information; and
   displaying the remote mouse cursor at the updated position.

3. The method of claim 1, where the graphical information includes a graphical user interface associated with a software application provided by the virtual machine.

4. The method of claim 1, where constraining the boundaries associated with the local mouse cursor comprises:
   preventing the local mouse cursor from moving further than a display area provided by the graphical information.

5. The method of claim 1, where the input information comprises a movement of the remote mouse cursor from a first location to a second location.

6. The method of claim 5, where correcting the magnitude associated with the input information comprises:
   reducing a mouse acceleration applied by the device based on the movement of the remote mouse cursor.

7. The method of claim 1, wherein correcting the magnitude associated with the input information further comprises:
   receiving the input information at a frequency that is less than the frequency at which an operating system of the device receives inputs.

8. A device, comprising:
   a memory; and
   a processor to:
      receive, from a virtual machine, graphical information and information relating to a position of a remote mouse cursor,
      display the graphical information and the remote mouse cursor,
      constrain boundaries associated with a local mouse cursor generated by the device,
      prevent the local mouse cursor from being displayed by the device,
      receive input information associated with the remote mouse cursor,
      correct a magnitude associated with the input information, wherein correcting the magnitude associated with the input information comprises:

receiving the input information at a frequency that is different than a frequency at which an operating system of the device receives inputs, and provide the corrected information to the virtual machine.

9. The device of claim 8, where the processor is further to:

receive, based on the corrected input information, updated graphical information and an updated position of the remote mouse cursor, display the updated graphical information, and display the remote mouse cursor at the updated position.

10. The device of claim 8, where the graphical information includes a graphical user interface associated with an application provided by the virtual machine.

11. The device of claim 8, where, when constraining the boundaries associated with the local mouse cursor, the processor is further to:

prevent the local mouse cursor from moving further than a display area provided by a display of the device.

12. The device of claim 8, where the input information comprises a movement of the remote mouse cursor from a first location to a second location.

13. The device of claim 12, where, when correcting the magnitude associated with the input information, the processor is further to:

reduce a mouse acceleration applied by the device based on the movement of the remote mouse cursor.

14. The device of claim 8, wherein, when correcting the magnitude associated with the input information, the processor is further to:

receive the input information at a frequency that is less than the frequency at which the operating system of the device receives inputs.

15. A non-transitory computer-readable medium, comprising:

one or more instructions that, when executed by a processor of a device, cause the processor to:

receive, from a virtual machine, graphical information and information relating to a position of a remote cursor, display the graphical information and the remote cursor, constrain boundaries associated with a local cursor generated by the device, prevent the local cursor from being displayed by the device, receive input information associated with the remote cursor, correct a magnitude associated with the input information, wherein, when correcting the magnitude associated with the input the information, the non-transitory computer-readable medium further comprises:

one or more instructions that, when executed by the processor, cause the processor to:

receive the input information at a frequency that is different than a frequency at which an operating system of the device receives inputs, and provide the input information, with the corrected magnitude, to the virtual machine.

16. The non-transitory computer-readable medium of claim 15, further comprising:

one or more instructions that, when executed by the processor, cause the processor to:

receive, based on the input information with the corrected magnitude, updated graphical user information, and an updated position of the remote cursor, display the updated graphical information, and display the remote cursor at the updated position.

17. The non-transitory computer-readable medium of claim 15, wherein the graphical information includes a graphical user interface associated with a software application provided by the virtual machine.

18. The non-transitory computer-readable medium of claim 15, wherein, when constraining the boundaries associated with the local cursor, the non-transitory computer-readable medium further comprises:

one or more instructions that, when executed by the processor, cause the processor to:

prevent the local cursor from moving further than a display area provided by the graphical information.

19. The non-transitory computer-readable medium of claim 15, wherein the input information comprises a movement of the remote cursor from a first location to a second location.

20. The non-transitory computer-readable medium of claim 19, wherein, when correcting the magnitude associated with the input information, the non-transitory computer-readable medium further comprises:

one or more instructions that, when executed by the processor, cause the processor to:

reduce correction assistance applied by the device based on the movement of the remote cursor.

21. The non-transitory computer-readable medium of claim 15, wherein, when correcting the magnitude associated with the input information, the non-transitory computer-readable medium further comprises:

one or more instructions that, when executed by the processor, cause the processor to:

receive the input information at a frequency that is less than the frequency at which the operating system of the device receives inputs.

\* \* \* \* \*